April 24, 1934.　　　S. H. CAPELIS　　　1,956,313
RETRACTABLE LANDING GEAR
Filed June 25, 1932
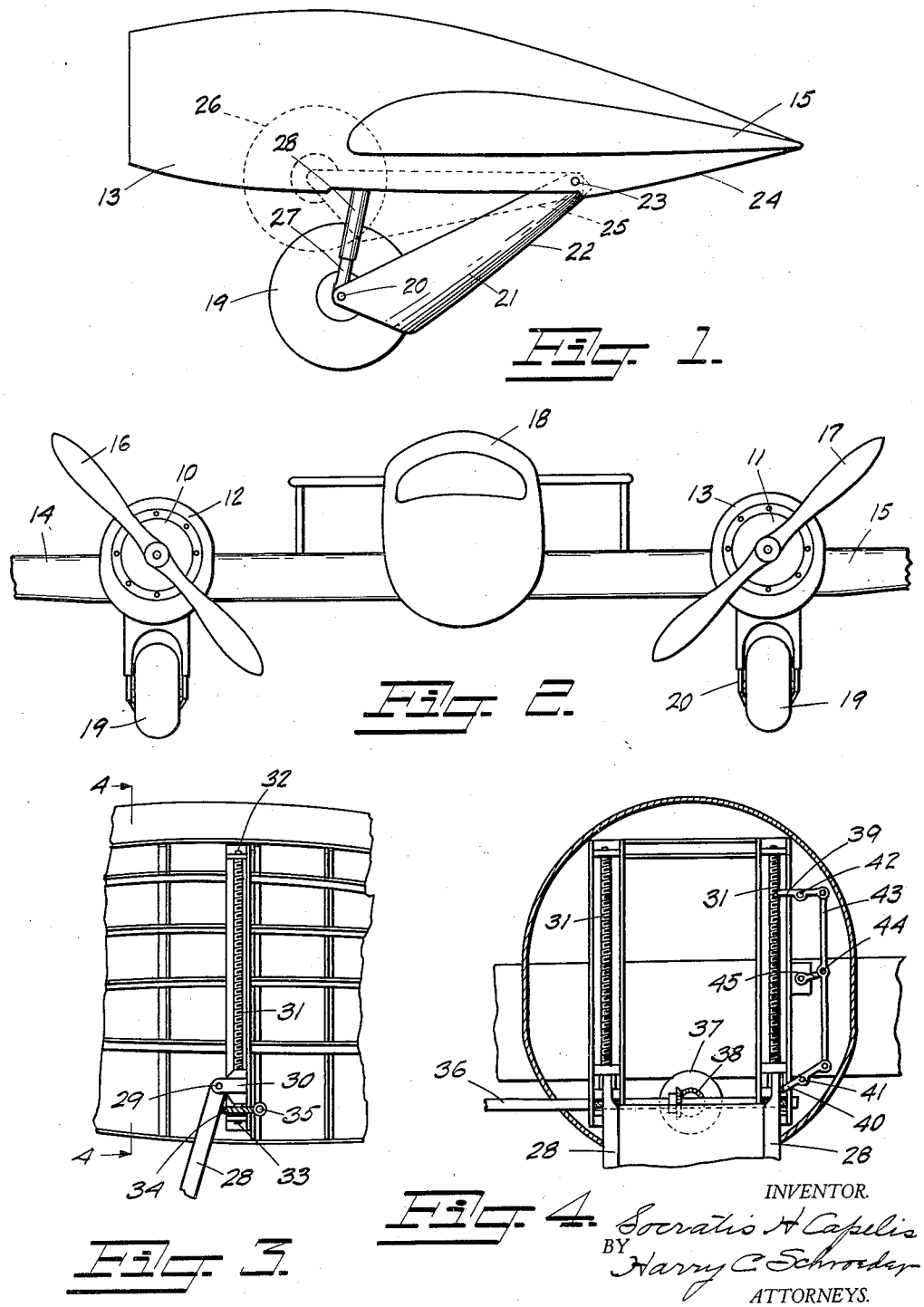
INVENTOR.
Socratis H Capelis
BY Harry C Schroeder
ATTORNEYS.

Patented Apr. 24, 1934

1,956,313

UNITED STATES PATENT OFFICE 1,956,313

RETRACTABLE LANDING GEAR

Socratis H. Capelis, El Cerrito, Calif.

Application June 25, 1932, Serial No. 619,183

12 Claims. (Cl. 244—2)

This invention is a retractable landing gear for airplanes. Landing gears as at present provided on airplanes either fold against the wing structure or are retracted within the fuselage.

The present invention contemplates the provision of the landing gear elements in such position as to effectively balance the weight of the wing motors as also the wing structure and fuselage, and also to provide a retractable landing gear which, when projected, will provide a braking effect.

The main object of the invention, therefore, is to provide a landing gear at the points of maximum loading of the wings.

Another object of the invention is to provide a retractable landing gear which is retractable within the wing motor housings and which landing gear is suitably supported within the housing.

A further object of the invention is to provide means whereby the individual units of the landing gear are coincidently projected or retracted and also providing suitable means for limiting the projecting or retracting movements of the landing gear.

A still further object of the invention is to provide a boot for the landing gear which, when in projected position, will form a resistance element adapted to cooperate with the air currents to act as a brake for stopping the airplane, and which, when in retracted position, will effectively close the opening in the bottom of the housing and continue the stream-line form of the housing.

Other objects and advantages of the invention will become apparent as the following description will be read on the drawing forming a part of this specification and in which similar reference characters are used to designate similar parts throughout the several views, of which:

Fig. 1 is a side elevation of my invention.

Fig. 2 is a front elevation showing my invention as applied to an airplane.

Fig. 3 is an enlarged interior view showing the mechanism for projecting and retracting the landing gear.

Fig. 4 is a section taken on line 4—4 of Fig. 3.

The invention, in certain features, is applicable to any type of airplane, but is specially directed to multi-motored planes in which some of the motors are mounted on or in the wings. For airplanes in which there is no wing motor housing, a separate housing may be provided in which the landing gear may be retracted and in such cases a housing somewhat similar to the regular motor housing would be provided.

The drawing shows the invention as applied to the typical multi-motored monoplane having motors 10 and 11 mounted on or in motor housings 12 and 13 which motor housings are integral with the wings 14 and 15, the motors driving propellers 16 and 17 forwardly of the wings. No change is made in the fuselage structure 18 or any other features of the airplane.

The landing gear consists of pneumatic wheels 19 which are pivotally mounted at 20 in a boot 21, the boot being transversely formed to U-shape, so that the cross member 22 of the U in conjunction with the sides forms a type of pocket, in which the backward travel of air currents as indicated by the arrow, will travel up the interior surface of the boot or scoop into the housing 13 creating increased pressure on the front surface of the boot, the reaction of the air creating a counter current air flow and increasing the pressure in the rear end of the housing, thus increasing the braking facility of the device. In addition, this boot forms a strut for the wheel 10, the boot being pivoted to the housing at 23, the sides and bottom of the boot continuing the streamline form of a rearward portion 24 of the housing as indicated by the dotted line at 25 when the landing gear is retracted as is indicated by the dotted lines 26.

Hingedly connected at 20 are shock absorbing struts 27 which are provided with suitable shock absorbers 28, the upper end of which are pivotally connected at 29 to a traveling nut 30, which cooperates with a screw 31, the screw being suitably mounted in bearings 32 and 33, the screw being driven by means of a worm gear 34 in cooperation with a worm 35, one of these units 27 to 35 being provided for each side of each wheel unit 19.

The screws 31 are all simultaneously driven by means of a shaft 36, which shaft may be driven by means of a motor or other suitable means 37 through bevel gears 38 as indicated in Fig. 4.

Suitable means is provided for limiting the projecting or retracting movements of the landing gear, and is indicated in Fig. 4 as consisting of levers 39 and 40 which are pivoted at 41 and 42 and connected together for coincident movement by means of a connecting rod 43, the connecting rod 43 being connected to suitable switches 44 for reversing the direction of the motor 37, or the switch 44 may be replaced by suitable mechanism for operating a suitable clutch drive connected with one of the motors.

The reversing of the motors may be readily accomplished by the usual system of a reversing switch and two three-point switches operated by the levers 39 and 40 or connecting rod 43 or by single lever 45, and providing an additional three-point switch for the pilot's control. This type of circuit is well known and is not believed to require any particular description as it is within the province of any electrician to provide the suitable wiring.

The operation of the device is as follows:

By driving the shaft 36 in one direction, the screws 31 are rotated through the worm gear 34 and worm 35 which worm 35 is mounted on the shaft 36. Depending on the direction of rotation of the screw 31, the nut 30 is either moved up or down on the screw 31, retracting or projecting the landing gear, the upward movement drawing the landing gear from the position shown in full lines in Fig. 1 to the retracted position shown by the dotted lines. When the landing gear is retracted, the boot 21 is in the position shown by the dotted lines at 25, and the lower front portion of the wheel 19 forms the forward portion of a substantially continuous element, continuing with the boot 21 and the tail 24 of the housing 13. This arrangement provides for a minimum wind resistance due to the stream-line form, while in the projected position shown by the solid lines in Fig. 1, the air currents pass into the boot 21 and are forced back into the housing 13, increasing the pressure in the rear end thereof, setting up eddies which continue out of the housing adjacent the position of the wheel in dotted lines in Fig. 1, reducing the pressure in the front end of the housing creating a counter air current which sets up sufficient wind resistance to create a substantial braking action on the airplane.

Having described an operative device it will be understood that variations in construction and arrangement of parts which are consistent with the appended claims may be resorted to without detracting from the spirit or scope of the invention or sacrificing any of the advantages thereof.

I claim:

1. In combination with the wing of an airplane having a motor mounting housing thereon; a landing gear supported by said housing and retractable therein and a boot of U form in cross section coincidently forming a strut for the landing wheel and a closure for the gear receiving opening in the bottom of the housing, said boot forming a pocket directing the air currents backwardly into the housing and functioning as a brake.

2. In combination with the wing of an airplane having a motor mounting housing thereon; a landing gear supported by said housing and retractable therein, a boot of U form in cross section coincidently forming a strut for the landing wheel and a closure for the gear receiving opening in the bottom of the housing, said strut or boot also forming a resistance pocket when the landing gear is projected for braking the airplane, said pocket directing air currents backwardly into the housing.

3. In combination with the wing of an airplane having a motor mounting housing thereon; a landing gear supported by said housing and retractable therein, a boot coincidently forming a strut for the landing wheel and a closure for the gear receiving opening in the bottom of the housing, said strut or boot also forming a resistance pocket when the landing gear is projected, for braking the airplane, said boot being of such form as to continue the streamline form of the housing when retracted, and direct air currents backwardly into the housing when the landing gear is projected.

4. In combination with the wing of an airplane having motor mounting housing thereon; a landing gear supported by said housing and retractable therein, a boot of U-form in cross section coincidently forming a strut for the landing wheel and a closure for the gear receiving opening in the bottom of the housing, said boot also forming a resistance element by directing air currents backwardly into the housing when the landing gear is projected, for braking the airplane, said boot being of such form as to continue the streamline form of the housing, when the landing gear is retracted, and power means for projecting and retracting the landing gear.

5. In combination with a retractable airplane landing gear and a housing therefor; a boot of U form in cross section forming a strut for the landing gear and continuing the stream-line form of the housing when the landing gear is retracted and forming a brake by directing air currents backwardly into the housing.

6. In combination with a retractable airplane landing gear and a housing therefor; a boot of U form in cross section forming a strut for the landing gear and continuing the stream-line form of the housing when the landing gear is retracted, and forming a wind resistance brake when the landing gear is projected, the boot forming a channel for directing air currents backwardly into the housing.

7. In combination with a retractable landing gear and a stream-line housing therefor; a boot of U form in cross section forming a strut for the landing gear and continuing the stream-line form of the housing when the landing gear is retracted and forming a wind resistance brake when the landing gear is projected by directing air currents backwardly into the housing, power means for projecting and retracting said landing gear and means for limiting the projecting and retracting movements of said landing gear.

8. A retractable landing gear comprising a housing, two spaced apart, parallel screws vertically mounted in said housing, a nut for each screw, a shock absorbing strut pivotally connected at one end to each nut, a wheel pivotally mounted between the struts and a strut-forming boot hingedly connected at one end to the housing, the other end of said boot spanning the wheel and being pivoted on the wheel pivot in a plane parallel to the hinged connection.

A retractable landing gear comprising a housing, two spaced apart, parallel screws mounted in said housing, a nut for each screw, a shock absorbing strut for each nut and having one end pivotally connected to the nut, a wheel pivotally mounted between the struts and a strut-forming U shaped boot hingedly connected at one end to the housing, the other end of said boot spanning the wheel and being pivoted on the wheel pivot said boot forming a pocket when the landing gear is projected, means for driving said screws, means for automatically limiting the movement of said nuts in each direction of travel, said pocket directing air currents backwardly into the housing to provide a resistance brake.

10. Means for mounting a landing wheel comprising in combination with a housing, a U-shaped strut having one end pivotally connected to said housing, the other end spanning the wheel and having the wheel pivoted therein, a pair of shock absorbing struts having one end hingedly connected to the U-shaped strut, the other end being connected to retractive means, said U-shaped strut forming a closure when the wheel is retracted, and forming a wind resistance brake when projected, by directing air currents backwardly into the housing.

11. A combined retractable landing gear and wind brake comprising a housing having an opening in the bottom thereof, a landing wheel and supporting means therefor retractable through said opening into said housing and means cooperating with said wheel and said housing forming a strut for the landing gear and a passage directing air currents backwardly into said housing functioning as a wind brake when the landing gear is projected and forming a closure for the opening when the landing gear is retracted.

12. A combined retractable landing gear and wind brake comprising a housing having an opening in the bottom thereof, a landing wheel and supporting means therefor retractable through said opening into said housing and means cooperating with said wheel and said housing forming a strut for the landing gear and a passage directing air currents backwardly into said housing functioning as a wind brake when the landing gear is projected and forming a closure for the opening when the landing gear is retracted, said means comprising a channel of U form in cross-section, the legs of the U spanning about the rear of the wheel, the channel being pivoted at one of its ends to the wheel pivot and at the other of its ends to the housing at the rearward end of the opening, thereby forming a wind deflecting passage for directing air currents backwardly and upwardly into the housing, forming the wind brake.

SOCRATIS H. CAPELIS.